United States Patent
Huber et al.

(10) Patent No.: US 8,590,872 B2
(45) Date of Patent: Nov. 26, 2013

(54) DEVICE FOR HOLDING AN OBJECT UNDER MEASUREMENT IN A REFERENCE POSITION

(75) Inventors: Alfred Huber, Eppelborn (DE); Franz-Rudolf Junker, Tholey-Sotzweiler (DE)

(73) Assignee: Junker & Partner GmbH, Tholey (DE)

( * ) Notice: Subject to any disclaimer, the term of this patent is extended or adjusted under 35 U.S.C. 154(b) by 423 days.

(21) Appl. No.: 12/799,536

(22) Filed: Apr. 27, 2010

(65) Prior Publication Data
US 2010/0276856 A1   Nov. 4, 2010

(30) Foreign Application Priority Data

Apr. 30, 2009   (DE) .......................... 10 2009 020 313

(51) Int. Cl.
*B23Q 3/00*   (2006.01)
*B23Q 1/25*   (2006.01)
*B25B 11/00*  (2006.01)
*B25B 1/20*   (2006.01)

(52) U.S. Cl.
USPC ........... 269/9; 269/289 R; 269/302.1; 269/43; 269/66; 269/21; 269/71

(58) Field of Classification Search
USPC .............. 269/289 R, 302.1, 43, 66, 21, 71, 9
See application file for complete search history.

(56) References Cited

U.S. PATENT DOCUMENTS 5,305,992 A * 4/1994 Kish ................................ 269/51
5,694,678 A * 12/1997 Karasik ........................... 29/721
5,735,056 A * 4/1998 Gosine ............................ 33/573

FOREIGN PATENT DOCUMENTS

DE       299 08 179       9/2000

* cited by examiner

*Primary Examiner* — Monica Carter
*Assistant Examiner* — Nirvana Deonauth
(74) *Attorney, Agent, or Firm* — Jordan and Hamburg LLP

(57) ABSTRACT

An apparatus for holding a measurement object, particularly a formed sheet metal component of a vehicle body, in a reference position, comprises at least one carrier which holds the measurement object and has a carrier head that can be placed against the measurement object. The carrier comprises a plurality of carrier heads which can optionally be moved, relative to the rest of the carrier, into contact positions and the carrier heads can be pivoted about an axis.

12 Claims, 2 Drawing Sheets

DEVICE FOR HOLDING AN OBJECT UNDER MEASUREMENT IN A REFERENCE POSITION

BACKGROUND OF THE INVENTION

The invention relates to an apparatus for holding a measurement object, particularly a formed sheet metal component of a vehicle body, in a reference position, comprising at least one carrier which holds the measurement object and has a carrier head that can be placed against the measurement object.

Holding apparatuses of this type are known, for example, from DE 299 08 179 U1. They are used, for example, within the context of the development and production of vehicle bodies. In these apparatuses, it is important that the contact points of the carrier heads or carrier head assume a precisely defined position.

SUMMARY OF THE INVENTION

It is the object of the invention to create a new apparatus of the type mentioned above, which has expanded possibilities for use.

The apparatus according to the invention for achieving this object is characterized in that the carrier comprises a plurality of carrier heads which can optionally be moved, relative to the rest of the carrier, into contact positions.

Advantageously, such a holding apparatus can be adapted to different measurement objects with little effort, and can accordingly be used for several measurement objects.

In a preferred embodiment of the invention, the carrier heads can be pivoted about an axis so as to move them into contact positions. In particular, the carrier heads can be pivoted about axes disposed perpendicular with respect to each other, the carrier preferably having two carrier heads.

The carrier heads can be connected to the rest of the carrier by way of a joint forming a pivot axis.

Advantageously, the carrier heads can be locked in contact position and precisely aligned. For precise alignment, dowel pins can be provided, for example. At the same time, the dowel pins can be used for locking purposes.

Advantageously, a single dowel pin, which can be used for all carrier heads, is captively connected to the carrier by way of a flexible strand.

In the preferred embodiment of the invention, the longitudinal axis of the dowel pin extends parallel to the pivot axis of the carrier head in the carrier head contact position.

The carrier head, or the rest of the carrier, preferably comprises fork arms which are disposed at a distance from the respective pivot axis, and between which a block, which is connected to the rest of the carrier or carrier head, engages in the carrier head contact position, the dowel pin penetrating through-holes in the fork arm and the block, in the carrier head contact position.

In a further embodiment of the invention, the rest of the carrier may comprise a pillar carrying the carrier head, and the pivot axes are disposed laterally offset with respect to the carrier pillar, as viewed from above the carrier head.

The invention will be described hereinafter based on exemplary embodiments and the accompanying drawings referencing these exemplary embodiments.

DESCRIPTION OF THE PREFERRED EMBODIMENTS

Figure 1:
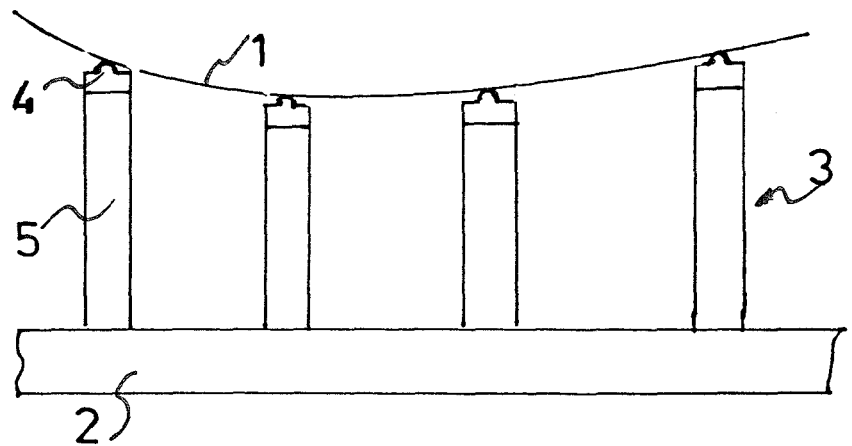
FIG. 1 a holding apparatus for holding a formed sheet metal component in a reference position, wherein an apparatus according to the invention can be used in this holding apparatus.

FIG. 1 shows an apparatus for holding a measurement object 1 constituted by a formed sheet metal component. The measurement object 1 is held in a reference position by a plurality of carriers 3 disposed on a base plate 2 and can be measured in this position, for example, by a coordinate measuring machine scanning the measurement object. Each of the carriers 3 comprises a carrier head 4, which can be placed against the measurement object 1, for example in punctiform manner, and which is disposed on a carrier pillar 5.

At least one of the carriers 3 can be formed, for example, by an apparatus described hereinafter with reference to FIGS. 2 to 4.

Figure 2:
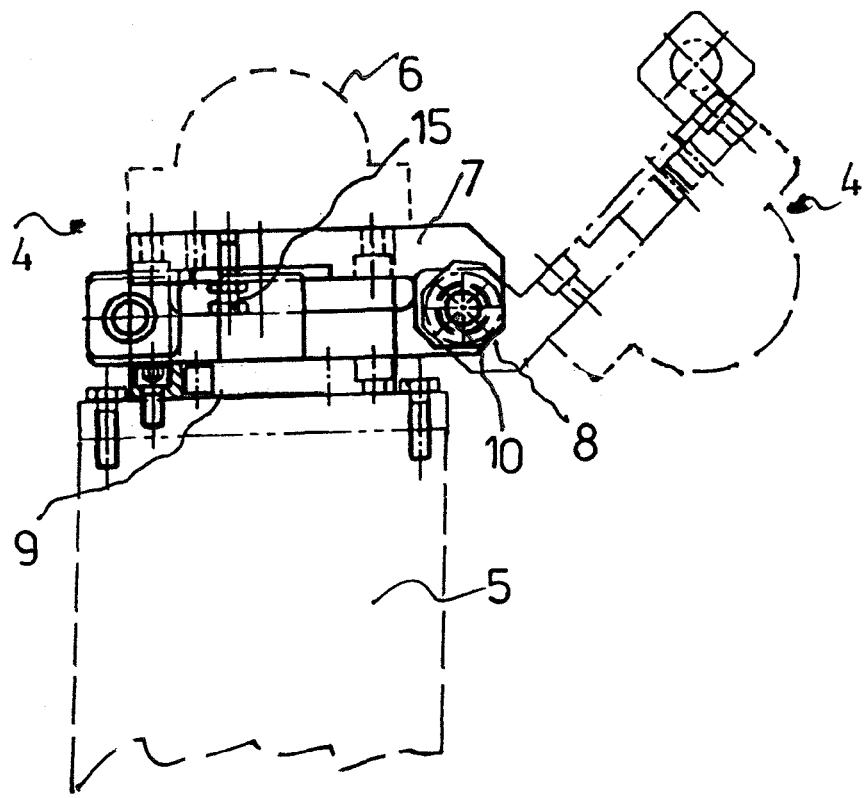
FIG. 2 an exemplary embodiment of an apparatus according to the invention in a side view.

A carrier head 4, which comprises an element 6, illustrated schematically by dashed lines, for punctiform contact with a measurement object, is disposed on a carrier pillar 5, which is shown partially in FIG. 2. The element 6 may be adjustable so as to vary the position of the contact point, and is connected to a pivotable base part 7 of the carrier head, which is coupled to a holding part 9 provided on the carrier pillar 5 at 8. The holding part 9 comprises a base plate having a cross-shaped projection.

Opposite the articulated joint 8 at a distance thereto, the base part 7 has two protruding fork arms 11, each having a through-hole 12, on the side thereof facing the holding part 9. A block 14, which is provided with a through-hole 13, and is connected to the holding part 9, may be arranged between the fork arms 11. A stop 15 ensures that through-holes 12 and 13 are approximately aligned with each other in the final pivot position of the carrier head 4 shown in FIG. 2.

In the illustrated final pivot position, the carrier head can be locked and precisely aligned by a pin 16, which engages in the through-holes 12, 13. The pin 16 is provided with a handle 17 and serves as the dowel pin, which ensures a precise arrangement of the carrier head 4 in the intended target position.

Figure 4:
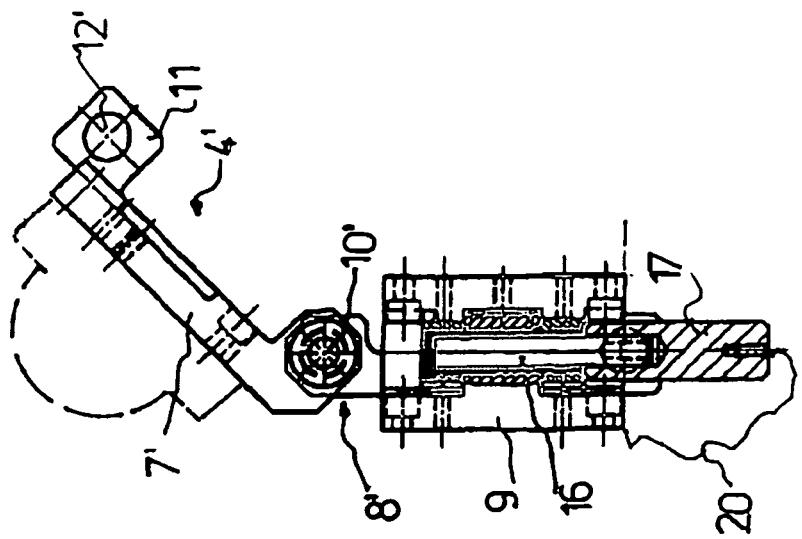
FIG. 4 the apparatus of FIG. 2 in a side view rotated 90° with respect to the side view of FIG. 2.
Figure 3:
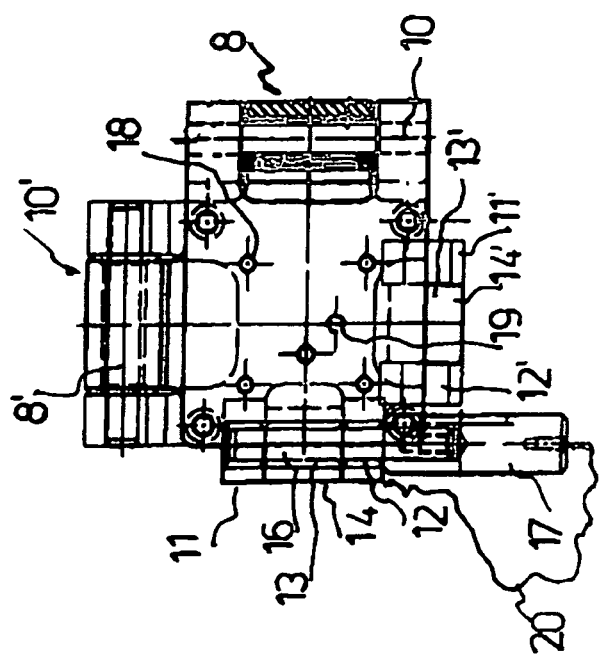
FIG. 3 the apparatus of FIG. 2 in a top view.

It is particularly apparent from FIGS. 3 and 4 that a second carrier head 4', which can be pivoted about an axis 10', is provided in addition to the carrier head 4 and is connected to the holding part 9 by way of an articulated joint 8', in the same manner as the carrier head 4, or can be connected by way of a block 14' and fork arm 11', the pivot axis 10' of the carrier head being disposed perpendicular to the pivot axis 10 of the carrier head 4.

Fitted bores 18 are used to precisely align the holding part 9 on the carrier pillar 5. Fitted bores 19 precisely align the element 6 on the base part 7 or 7' of carrier head 4 or 4'.

The apparatus described above can be adapted to different measurement objects with little effort, by selecting either the carrier head 4 or the carrier head 4' (having different dimensions). The respective other carrier head is then located in a folded-over parking position. Because the pivot axes 10, 10' of the carrier heads 4, 4' or the articulated joints 8, 8' are disposed with sufficient lateral offset, as seen in the top view of the carrier heads 4 or 4' which are in the working position, free space is created in the folded-out state of one carrier head for folding in the other.

The pin 16 can be used for locking both one and the other carrier head, or for the precise alignment thereof. In some embodiments it is captively connected to the carrier by way of a flexible strand 20 (See FIGS. 3 and 4).

The invention claimed is:

1. An apparatus for holding a formed sheet metal component of a car body in a reference position, comprising a plurality of carriers which hold the formed sheet metal component, each carrier having a carrier structure and a carrier head that can be placed against the formed sheet metal component, wherein at least one of the carriers has a plurality of carrier heads, each one of the plurality of carrier heads of said at least one carrier alternately movable relative to the carrier structure of said at least one of the carriers from a parking position to a working position in which said one of the carrier heads is placed against the sheet metal component, wherein said each one plurality of carrier heads of said at least one carrier can be locked in the working position by a dowel pin, and can be aligned, and wherein a longitudinal axis of the dowel pin extends parallel to a pivot axis of said each one carrier head in the working position; and wherein said each one of said plurality of carrier heads of said at least one carrier can be pivoted about the pivot axis in order to move into the working position.

2. The apparatus according to claim 1, wherein said plurality of carrier heads of said at least one carrier can be pivoted about axes which are arranged perpendicular to each other.

3. The apparatus according to claim 1, wherein said plurality of carrier heads of said at least one carrier are connected to the carrier structure by way of a joint forming the pivot axis.

4. The apparatus according to claim 1, wherein said plurality of carrier heads of said at least one carrier can be locked in the working positions and can be precisely aligned.

5. The apparatus according to claim 1, wherein the dowel pin is captively connected to the carrier by way of a flexible strand.

6. The apparatus according to claim 1, wherein the carrier head or has fork arms at a distance from the respective pivot axis, between which a block, which is connected to the carrier structure, engages in the working position, and in the respective, working position the dowel pin is disposed in through-holes in the fork arms and the block.

7. The apparatus according to claim 1, wherein the carrier structure comprises a pillar carrying the at least one carrier head of said at least one carrier, and the pivot axis of said at least one carrier head of said at least one carrier, viewed from above the at least one carrier head of said at least one carrier, being disposed laterally offset with respect to the pillar.

8. The apparatus according to claim 1, wherein the carrier head structure has fork arms at a distance from the respective pivot axis, between which a block, which is connected to the carrier head, engages in the working position, and in the respective working position, the dowel pin is disposed in through-holes in the fork arms and the block.

9. An apparatus for holding a measurement object in a reference position, comprising a plurality of carriers each having a carrier head and a carrier structure, wherein the carrier head of at least one carrier which holds the measurement object can be placed against the measurement object, the carrier heads optionally movable, relative to the carrier structure, into contact positions, wherein the carrier heads can be locked in the contact positions by a dowel pin, and can be aligned, and wherein the dowel pin is captively connected to the carrier by way of a flexible strand.

10. An apparatus for holding a measurement object in a reference position, comprising a plurality of carriers each having a carrier head and a carrier structure, wherein the carrier head of at least one carrier which holds the measurement object can be placed against the measurement object, the carrier heads optionally movable, relative to the carrier structure, into contact positions, wherein the carrier heads can be locked in the contact positions by a dowel pin, and can be aligned, and wherein the longitudinal axis of the dowel pin extends parallel to a pivot axis of the carrier head in the carrier head contact position for each of said carrier head, and wherein said carrier heads can be pivoted about the pivot axis in order to move into the contact positions.

11. An apparatus for holding a measurement object in a reference position, comprising a plurality of carriers each having a carrier head and a carrier structure, wherein the carrier head of at least one carrier which holds the measurement object can be placed against the measurement object, the carrier heads optionally movable, relative to the carrier structure, into contact positions, wherein the carrier heads can be locked in the contact positions by a dowel pin, and can be aligned, and wherein the carrier head has fork arms at a distance from a respective pivot axis, between which a block, which is connected to the carrier structure, engages in the contact position of said carrier head, and in the respective carrier head contact position, the dowel pin is disposed in through-holes in the fork arms and the block.

12. An apparatus for holding a measurement object in a reference position, comprising a plurality of carriers each having a carrier head and a carrier structure, wherein the carrier head of at least one carrier which holds the measurement object can be placed against the measurement object, the carrier heads optionally movable, relative to the carrier structure, into contact positions, wherein the carrier heads can be locked in the contact positions by a dowel pin, and can be aligned, and wherein the carrier head has fork arms at a distance from a respective pivot axis, between which a block, which is connected to the carrier head, engages in the contact position of said carrier head, and in the respective carrier head contact position, the dowel pin is disposed in through-holes in the fork arms and the block.

* * * * *